(12) United States Patent
Edlund et al.

(10) Patent No.: US 9,104,689 B2
(45) Date of Patent: Aug. 11, 2015

(54) METHOD FOR SYNCHRONIZING DOCUMENTS FOR DISCONNECTED OPERATION

(75) Inventors: Stefan Bengt Edlund, San Jose, CA (US); Joann Ruvolo, San Jose, CA (US); Justin Thomas Lessler, San Jose, CA (US); Sesha Sung Shan Baratham, Acton, MA (US)

(73) Assignee: International Business Machines Corporation, Armonk, NY (US)

( * ) Notice: Subject to any disclaimer, the term of this patent is extended or adjusted under 35 U.S.C. 154(b) by 1642 days.

(21) Appl. No.: 10/802,321

(22) Filed: Mar. 17, 2004

(65) Prior Publication Data

US 2005/0210079 A1    Sep. 22, 2005

(51) Int. Cl.
*G06F 17/30*    (2006.01)

(52) U.S. Cl.
CPC ................................. *G06F 17/30174* (2013.01)

(58) Field of Classification Search
CPC ................................................ G06F 17/30174
USPC ........ 707/10, 104.1, 102, 6–7, 1–3, 200–204, 707/625, 626, 610–621
See application file for complete search history.

(56) References Cited

U.S. PATENT DOCUMENTS

| | | | | |
|---|---|---|---|---|
| 5,313,631 A | * | 5/1994 | Kao | 707/204 |
| 6,493,725 B1 | * | 12/2002 | Iwai et al. | 707/200 |
| 6,950,987 B1 | * | 9/2005 | Hargraves et al. | 715/523 |
| 7,024,491 B1 | * | 4/2006 | Hanmann et al. | 709/248 |
| 7,092,977 B2 | * | 8/2006 | Leung et al. | 707/205 |
| 7,275,073 B2 | * | 9/2007 | Ganji et al. | 707/201 |
| 2002/0123988 A1 | * | 9/2002 | Dean et al. | 707/3 |
| 2002/0194205 A1 | * | 12/2002 | Brown et al. | 707/200 |
| 2003/0028554 A1 | * | 2/2003 | Koskimies et al. | 707/201 |
| 2003/0158866 A1 | * | 8/2003 | Goodwin et al. | 707/200 |
| 2003/0162555 A1 | * | 8/2003 | Loveland | 455/502 |
| 2003/0172113 A1 | * | 9/2003 | Cameron et al. | 709/204 |
| 2003/0182450 A1 | * | 9/2003 | Ong et al. | 709/246 |
| 2004/0230598 A1 | * | 11/2004 | Robertson et al. | 707/102 |
| 2005/0065856 A1 | * | 3/2005 | Roberts et al. | 705/26 |
| 2005/0071255 A1 | * | 3/2005 | Wang et al. | 705/27 |
| 2005/0071741 A1 | * | 3/2005 | Acharya et al. | 715/500 |
| 2005/0147130 A1 | * | 7/2005 | Hurwitz et al. | 370/503 |
| 2005/0154761 A1 | * | 7/2005 | Lee et al. | 707/104.1 |
| 2005/0204001 A1 | * | 9/2005 | Stein et al. | 709/206 |
| 2006/0184521 A1 | * | 8/2006 | Ponte | 707/5 |

* cited by examiner

*Primary Examiner* — Alexey Shimatov
(74) *Attorney, Agent, or Firm* — Schmeiser, Olsen & Watts LLP

(57) ABSTRACT

Described is a method for synchronizing a client with a server. A document score is calculated for each document in a server database. The document score indicates the importance of the respective document to the client. Documents are transferred from the server to the client if their document scores exceed a threshold value. The calculation of the document score can be determined from time the document was created, the number of times the document has been read, the time the document was last accessed, the author of the document and one or more terms in the document. Relationships between the document and other documents on the server database can also affect the document score.

16 Claims, 4 Drawing Sheets

METHOD FOR SYNCHRONIZING DOCUMENTS FOR DISCONNECTED OPERATION

FIELD OF THE INVENTION

The invention relates generally to a method for synchronizing documents between a database and a local workstation. In particular, the invention relates to a method for automatically determining the importance of documents to prioritize the documents for synchronization.

BACKGROUND

Information systems often allow users to transfer system data to local devices for off-line work. Some systems permit a user to indicate a database that the user desires to have available on a local workstation, or client. For example, the user may copy the database documents from the system to a laptop or similar client. The user can then make changes at the client to one or more documents in the local copy of the database. Edited documents are later copied from the client back to the information system database.

In some instances, it is not possible to maintain a complete local copy of the database. For example, a server database can contain a large number of documents and the client may not have sufficient data storage capacity to accommodate all the documents. In other instances, the time required to copy the documents into the client database can be prohibitively long, such as when the client is connected to the server over a low data rate link. A user may be able to designate a subset of the documents in the server database for synchronization. However, the process of indicating the desired documents for synchronization can be tedious and may require complicated decisions.

What is needed is a method for managing the synchronization of database documents with client devices that improves automatic synchronizations and does not require complex interactions with the user. The present invention satisfies this need and provides additional advantages.

SUMMARY OF THE INVENTION

In one aspect, the invention features a method for synchronizing a client having a client database with a server having a server database. A document score is calculated for each of a plurality of documents in the server database. The document score designates an importance of the document to the client. One of the documents in the server database is transmitted to the client based on a respective document score. In one embodiment, the document is transmitted if the respective document score exceeds a threshold value. In other embodiments, the calculation of the document score is determined from at least one of a time of creation of the document, a number of times the document has been read, a time of last access of the document, an author of the document and a term in the document. In yet another embodiment, the calculation of the document score is determined from a relationship between the document and another of the documents in the server database.

In another aspect, the invention features a computer program product for use with a computer system having a server with a server database. The server database stores a plurality of documents accessible to a client. The computer program product includes a computer useable medium having embodied therein program code for calculating a document score for each of the documents and program code for transmitting one of the documents in the server database to the client based on a respective document score.

In another aspect, the invention features an apparatus for synchronizing a client having a client database with a server having a server database. The apparatus includes means for calculating a document score for each of a plurality of documents in the server database and means for transmitting one of the documents in the server database to the client based on a respective document score.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

DETAILED DESCRIPTION

In brief overview the invention relates to a method for synchronizing a client database with a server database. Synchronization is based on calculation of a document score indicating the importance of the document to the client or group of clients. The document score is derived from the document content, meta-data and usage. Importance of a document, as used herein, means the significance, weight or relative value of the document in comparison to other documents. During synchronization, documents stored in a server database are copied to a client if the associated document scores exceed a threshold value. The threshold value is established to control the number of documents that are transferred to the client based, for example, on the available data storage capacity of the client and the data rate of the communication link between the client and the server.

Document scores are recalculated over time. Consequently, a document can be removed from the client database if its document score no longer exceeds the threshold value. In addition, a document in the server database that has a document score less than the threshold value can be transferred to the client at a later time if its recalculated (i.e., future) document score is greater than the threshold value. Even if the document score does not change, the document can still be transferred to the client if the threshold value is decreased to less than the document score.

Document as used herein means the most basic unit available for synchronization. For example, a document can be a word processing document, an e-mail, a calendar entry and the like. Each document is associated with a unique document identifier and origin information, such as a server and a particular database on the server. Other properties, such as a version number, can also be associated with the document. The version number is typically incremented each time the document is modified. A timestamp indicating the time when the last modification occurred can be used in place of a version number.

Figure 1:
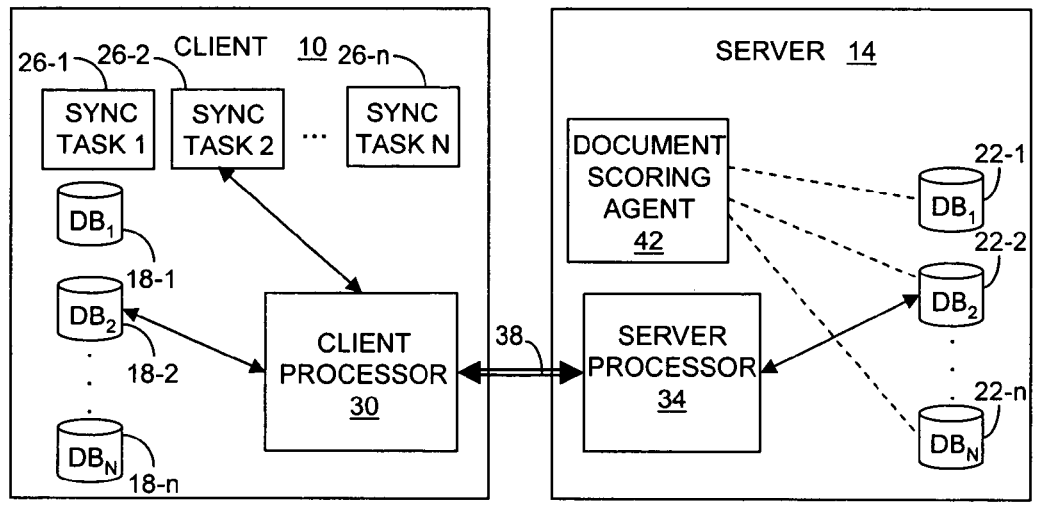
FIG. 1 illustrates a client in communication with a server for synchronization of a client database with a server database according to an embodiment of the invention.

Referring to FIG. 1, a client 10 is depicted in communication with a server 14 for performing a synchronization task according to an embodiment of the invention. The client 10 can be a desktop, laptop, PDA (personal digital assistant), palmtop, workstation or any other suitable digital computer capable of executing one or more applications for processing a document. The server 14 can be a workstation, minicomputer, desktop or any similar device on which documents and the databases containing the documents are managed for one or more clients 10. Although the server 14 is shown communicating with a single client 10, in other embodiments the server 14 communicates with two or more clients 10.

A device can act as a server 14 when communicating with a client device and the same device can act as a client 10 when communicating with a server device. For example, a device can maintain a database of documents from which one or more other devices acting as clients 10 can retrieve documents for local processing. The same device can also function as a client 10 by retrieving from and copying to a server database on another device.

In the illustrated embodiment, the client 10 and the server 14 each includes N databases 18-1 to 18-$n$ (generally 18) and 22-1 to 22-$n$ (generally 22), respectively. Each client database 18 is mapped to a related server database 22. The client databases 18 can include, by way of example, an e-mail database, an address book database and a recruiting database. Documents are synchronized according to a specified server database 22 on an identified server 14. The client 10 executes one or more predefined synchronization task 26-1 to 26-$n$ (generally 26). Each synchronization task 26 includes a threshold value, the name of the server 14 and the name of the database 22 on the server 14 for synchronization. The threshold value can be the maximum number of documents to synchronize or, alternatively, the minimum document score required for a document to be synchronized.

Processing modules 30 and 34 implement the synchronization functionality on the client 10 and server 14, respectively. For example, the processing modules 30, 34 coordinate access to the appropriate databases 18, 22, perform calculation of threshold values and document scores, and manage the transfer of data between the client 10 and the server 14. The client 10 and the server 14 communicate with each other over a bi-directional communication link 38. The communication link 38 can be established over any of a variety of networks, such as the Internet or an intranet, and can employ one or more communication types, such as copper, wireless and optical transmission formats.

A document scoring agent (i.e., software scoring module) 42 executed on the server 14 computes a document score for each document in each server database 22. The document score can be an integer value or a real number value and is determined according to the potential client value, or off-line value, for the document. A variety of factors such as how often the document has been read, how recently the document was created or accessed, the importance assigned to terms in the document and the importance assigned to the author of the document can affect the calculation of the document score. In addition, the document score can be influenced by the importance of other documents to the document being scored. For example, if a document that has a high document score is related to the document being scored, the calculated score is increased by a predetermined increment. This incremental increase improves the off-line experience of a client user by ensuring that any documents needed when working off-line (i.e., when disconnected from the server 14) on a given document are also available off-line. Such document relationships can be specified manually or automatically. Scores can be refreshed periodically, such as hourly, daily or weekly. The particular refresh cycle can be dependent on the volume of documents to be scored and the number of document scores associated with each document.

A document can be shared by many clients 10 such as an e-mail that is sent to multiple recipients. Thus it is can be advantageous for a document to have multiple document scores where each score is based on an importance defined according to a particular client 10 or client group having access to the document. Multiple document scores are desirable if certain terms in a document are of high importance to some clients 10 yet are not important to other clients 10. Similarly, the importance of a particular author can vary between clients 10.

Figure 2:
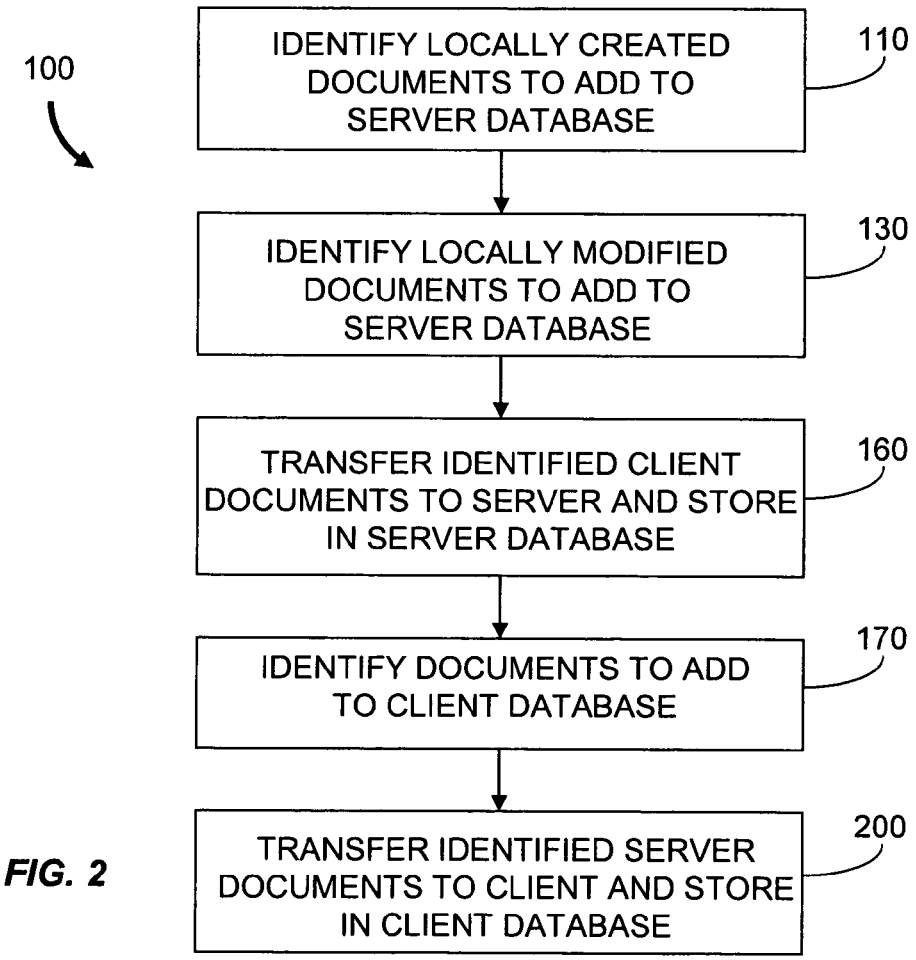
FIG. 2 is a flowchart representation of an embodiment of a method for synchronizing a client database with a server database according to the invention.

FIG. 2 is a flowchart representation of an embodiment of a method 100 for synchronizing a client with a server according to the invention. The method 100 includes identifying (step 110) any new documents that were locally created on the client 10 (i.e., created off-line and thus are not in a server database 22) to add to the server database 22 associated with the current synchronization task 26. Similarly, any documents from the server database 22 that were modified at the client 10 are identified (step 130). The new documents and modified documents are transferred and stored (step 160) in the current server database 22. Documents to be sent from the server 14 to the client 10 according to the current synchronization task 26 are identified (step 170) and then transferred (step 200). The method 100 is repeated for each synchronization task 26 executed by the client 10.

Figure 3A:
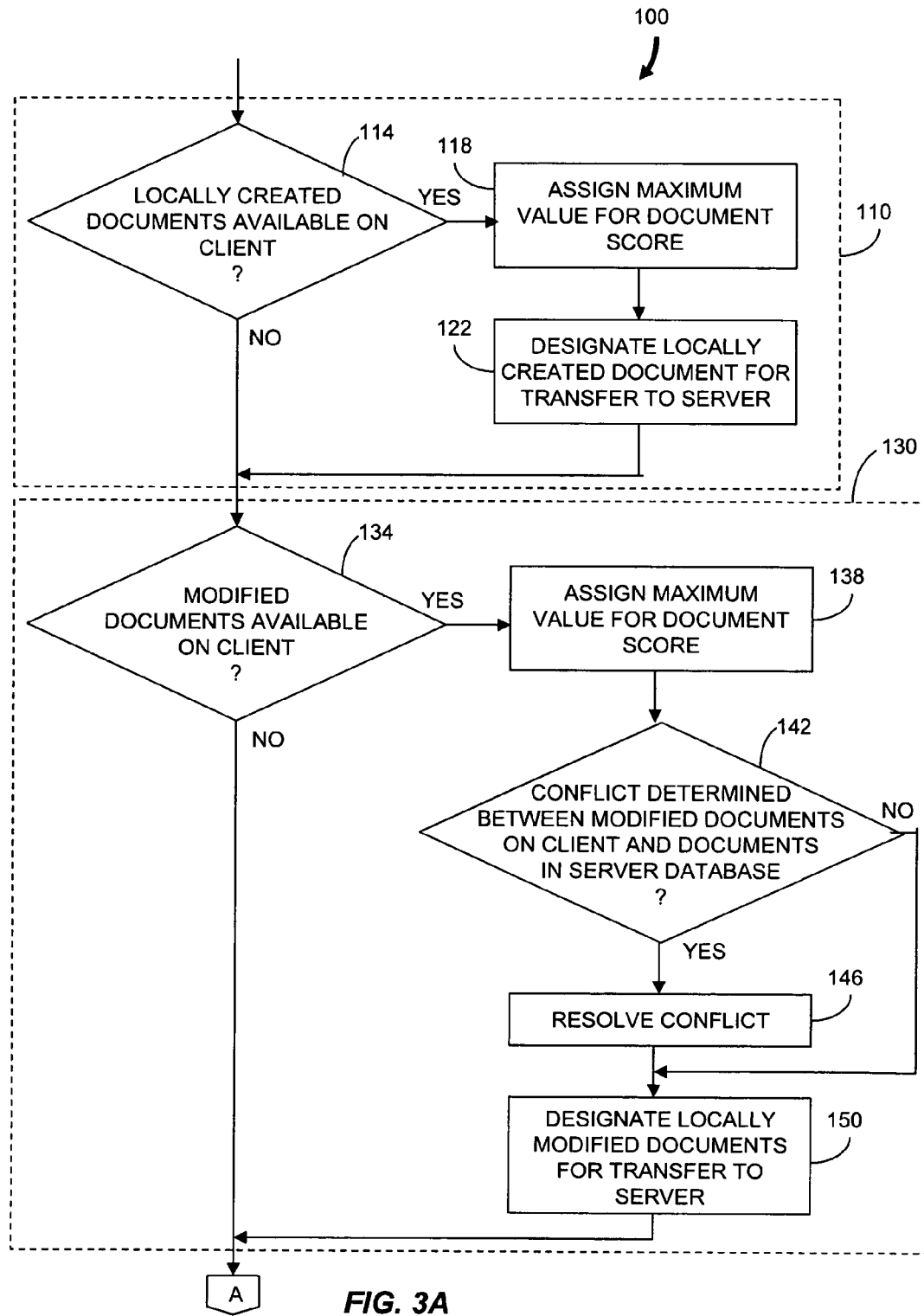
FIGS. 3A, 3B and 3C in combination are a flowchart representation of an embodiment of a method for synchronizing a client database with a server database according to the invention.
Figure 3B:
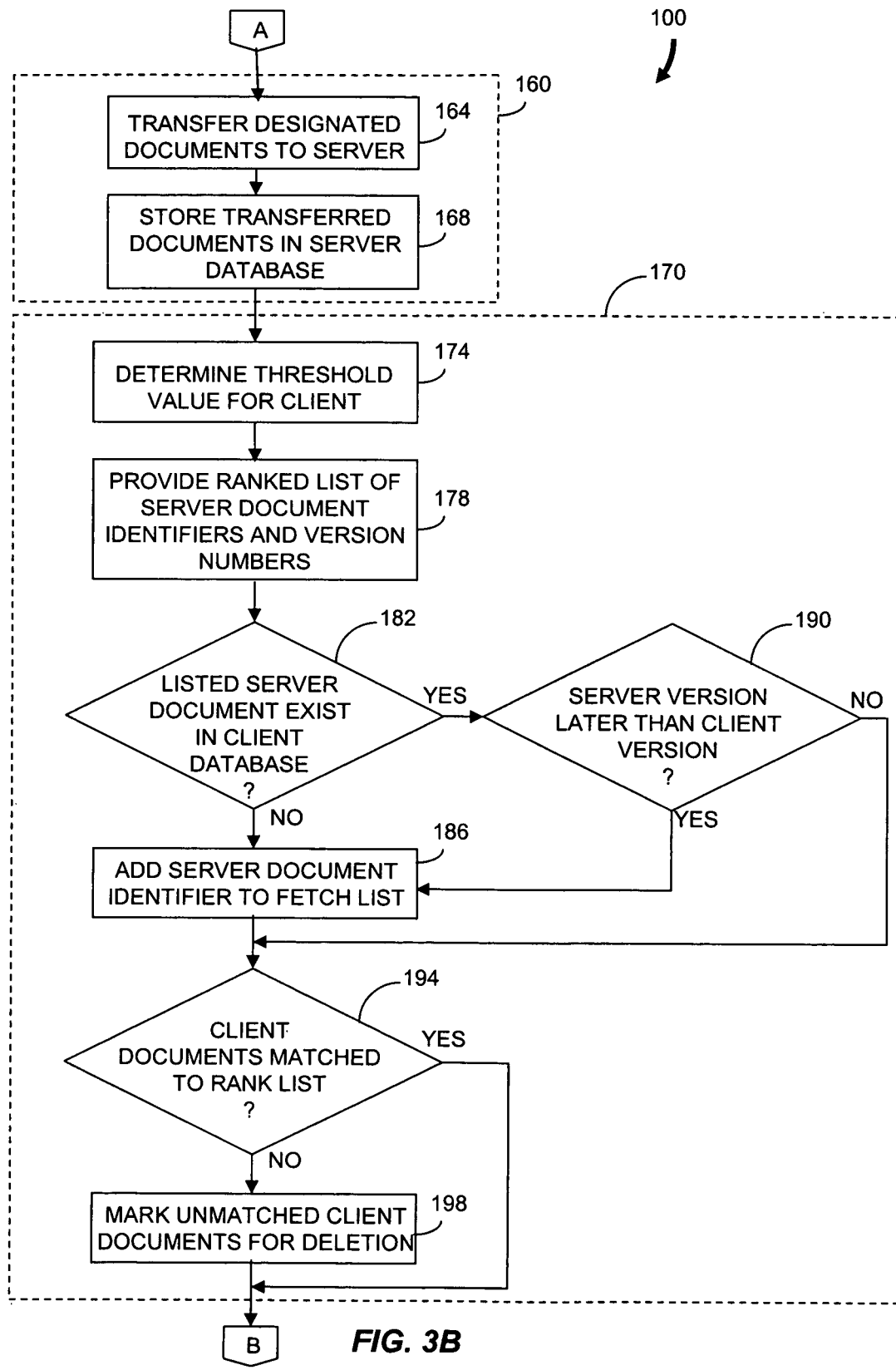
Figure 3C:
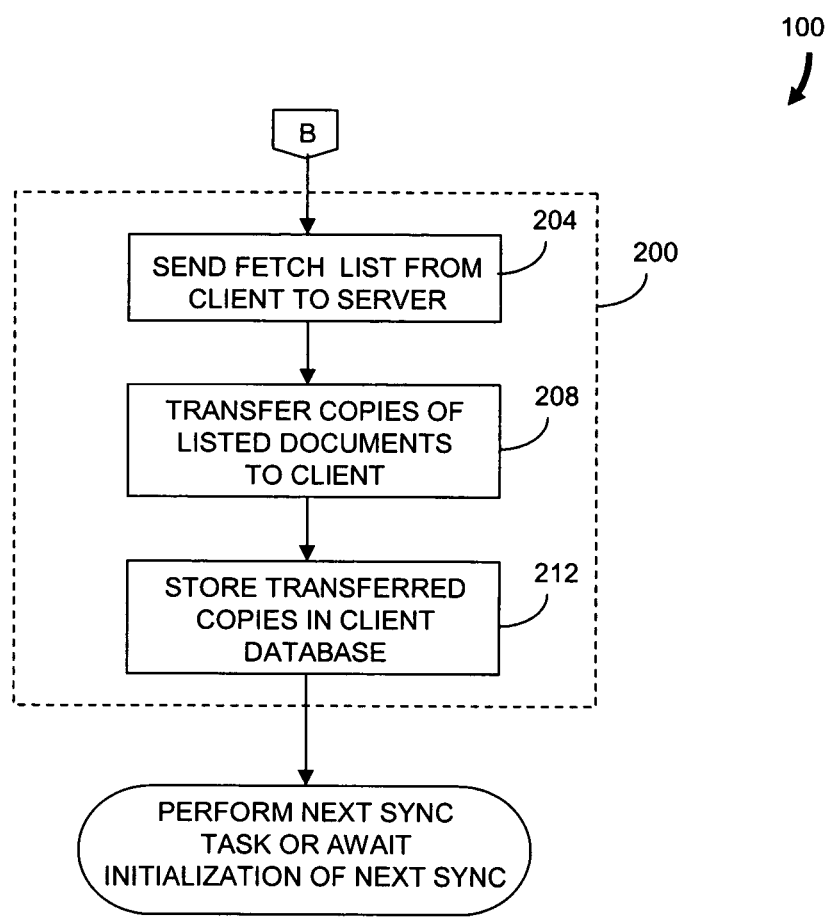

FIGS. 3A, 3B and 3C show the flowchart representation of the method 100 of FIG. 2 in more detail. Documents created on the client 10 while working off-line are determined (step 114). Any such documents do not yet have a computed document score. Each newly created document is assigned (step 118) a maximum value for its document score and is marked (step 122) for transfer to the server 14. In one embodiment, the assignment of the maximum value is made by the server 14 after the transfer of the documents is completed. A maximum value is assigned to prevent the newly created documents from automatic removal from the server database 22 (as described below) and because the new documents will most likely receive a high score the next time the server 14 computes document scores for the database 22.

Any documents that have been modified by the client 10 while working off-line are determined (step 134) and a maximum value is assigned (step 138) for the document score. If a conflict, such as a version number mismatch, is determined (step 142) for a modified document, the conflict is resolved (step 146) before designating, or marking, (step 150) the modified document for transfer to the server 14. Resolution can include merging the versions of conflicted documents, the undoing (i.e., removing) of the local changes and other conflict resolution techniques known in the art. All marked documents, including newly created documents and modified documents, are transferred (step 164) to the server 14 and stored (step 168) in the database 22 for the current synchronization task 26.

The method 100 continues by determining (step 174) the threshold value for the client 10 and providing (step 178) a ranked (i.e., prioritized) list of server document identifiers and corresponding version numbers for the current database 22. The ranked list is ordered according to the document scores computed by the document scoring agent. The client 10 compares the ranked list of server document identifiers to client document identifiers representing documents stored in the client database 18. If it is determined (step 182) that a listed document does not exist on the client 10, the corresponding server document identifier is added (step 186) to a fetch list. However, if it is determined (step 182) that the listed document does exist on the client 10, the version numbers are compared (step 190) and the server document identifier is added (step 186) to the fetch list only if the document is a later version than the document residing in the client database 18. If a client document is not matched to a complementary document on the server 14, i.e., if the client identifier is not matched (step 194) with a server document identifier, the client document can be immediately discarded. Alternatively, the client document is marked for deletion (step 198) but remains available at the client 10 until data storage capacity is depleted or reduced below a predefined level.

The method 100 continues with the client 10 sending (step 204) the fetch list to the server 14. In response, the server 14 transfers (step 208) the corresponding documents to the client 10. The client 10 stores (step 212) the transferred documents locally. In one embodiment, earlier versions of the transferred documents that were already in the client database 18 are overwritten. In another embodiment, if any of the transferred documents were previously marked for deletion by the client 14, the deletion indication is removed. In another embodiment, a compaction process is applied by the client 10. Compaction includes deleting client documents marked for deletion if sufficient data storage is not available at the client 10.

The method 100 is repeated for the next synchronization task 26. If synchronization is complete, i.e., no more synchronization tasks 26 await execution, the method 100 starts again at the initialization of the next synchronization between the client 10 and the server 14.

While the invention has been shown and described with reference to specific embodiments, it should be understood by those skilled in the art that various changes in form and detail may be made therein without departing from the spirit and scope of the invention. For example, software maybe embodied on any known non-transitory computer useable medium having embodied therein a computer program for storing data. In the context of this document a computer useable medium may be any tangible medium that can contain, or store a program for use by or in connection with an instruction execution system, apparatus, or device. A computer useable medium may be, for example, an electronic, magnetic, optical, electromagnetic, infrared, or semiconductor system, apparatus, or device, or any suitable combination of the foregoing. More specific examples of the computer useable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

What is claimed is:

1. A method for synchronizing a client having a client database with a server having a server database, the method comprising:

calculating at the server database, for a plurality of times and a plurality of clients, a document score for each document in a plurality of documents in the server database, each document score designating an importance relative to other documents of a respective one of the documents to a respective one of the clients at one of the times, each document score indicative of whether the document should be synchronized between the respective client and the server database, wherein calculating the document score includes determining whether a relationship exists between the respective one of the documents and another of the documents in the server database;

initiating a synchronization task at one of the clients, the synchronization task for updating documents in the client database to match documents in the server database, the synchronization task specifying a threshold value that indicates the document score value for a document to be synchronized, and identifying the server and the server database for synchronization;

sending from the identified server and server database to the client a list of server documents produced based upon a comparison of the threshold value to the document scores; and sending from the client to the identified server a fetch list based upon the list of server documents;

transmitting one of the documents in the server database to the client based on the fetch list.

2. The method of claim 1 wherein the step of sending comprises sending from the server to the client a list of server documents produced based upon a comparison of the threshold value to the document scores, wherein the list of server documents includes documents whose scores exceed the threshold value.

3. The method of claim 2 further comprising determining the threshold value based on a data storage capacity of the client.

4. The method of claim 1 wherein the calculating a document score for one of the documents is determined from at least one of a time of creation of the document, a number of times the document has been read, a time of last access of the document and an author of the document.

5. The method of claim 1 further comprising:
determining if the client database includes a newly created document; and
transmitting the newly created document to the server.

6. The method of claim 5 further comprising assigning a document score having a maximum value to the newly created document.

7. The method of claim 1 further comprising:
determining if the client database includes a modified document; and
transmitting the modified document to the server.

8. The method of claim 7 further comprising assigning a document score having a maximum value to the modified document.

9. The method of claim 7 further comprising resolving a conflict between the modified document in the client database and a modified document in the server database.

10. The method of claim 1 wherein the client database includes a plurality of client documents, the method further comprising designating for deletion one of the client documents based on a document score of a complementary document in the server database.

11. The method of claim 10 further comprising removing the designation for deletion based on a document score of the complementary document in the server database.

12. The method of claim 10 further comprising increasing a data storage capacity of the client by deleting the one of the client documents designated for deletion.

13. The method of claim 1 wherein the client database includes a plurality of client documents, the method further comprising removing one of the client documents from the client database based on a document score of a complementary document in the server database.

14. A computer program product for use with a computer system having a server with a server database, the server database storing a plurality of documents accessible to a client, the computer program product comprising a non-transitory computer useable medium having embodied therein program code comprising:

program code for calculating at the server database, for a plurality of times and a plurality of clients, a document score for each of the documents, each document score designating an importance relative to other documents of a respective one of the documents to a respective one of the clients at one of the times, each document score indicative of whether the document should be synchronized between the respective client and the server database, wherein calculating the document score includes determining whether a relationship exists between the respective one of the documents and another of the documents in the server database;

program code for initiating a synchronization task at one of the clients, the synchronization task for updating documents in the client database to match documents in the server database, the synchronization task specifying a threshold value that indicates the document score value for a document to be synchronized, and identifying the server and the server database for synchronization;

program code for sending from the identified server and server database to the client a list of server documents produced based upon a comparison of the threshold value to the document scores; and program code for sending from the client to the identified server a fetch list based upon the list of server documents; and program code for transmitting one of the documents in the server database to the client based on the fetch list.

15. The computer program product of claim 14 wherein the determination of the threshold value is based on a data storage capacity of the client.

16. The computer program product of claim 14 wherein the calculating a document score for one of the documents is determined from at least one of a time of creation of the document, a number of times the document has been read, a time of last access of the document and an author of the document.

* * * * *